US005186882A

United States Patent [19]

Hafner

[11] Patent Number: 5,186,882
[45] Date of Patent: Feb. 16, 1993

[54] METHOD FOR MOUNTING A FILTER ON THE VALVE

[75] Inventor: Udo Hafner, Ludwigsburg, Fed. Rep. of Germany
[73] Assignee: Robert Bosch GmbH, Stuttgart, Fed. Rep. of Germany

[21] Appl. No.: 800,308
[22] Filed: Nov. 29, 1991
[30] Foreign Application Priority Data
Nov. 29, 1990 [DE] Fed. Rep. of Germany ....... 4037952
[51] Int. Cl.[5] .................... B01D 35/02; F02M 51/08; B29C 67/18
[52] U.S. Cl. ................................ 264/257; 156/272.8; 239/533.2; 239/584; 239/900; 264/274
[58] Field of Search .............................. 264/257, 274; 156/272.8; 239/900, 584, 533.2

[56] References Cited

U.S. PATENT DOCUMENTS

| | | | |
|---|---|---|---|
| 1,949,106 | 2/1934 | Manneschmidt | 137/549 |
| 2,005,445 | 6/1935 | Wiedhoff | 137/549 |
| 3,371,138 | 2/1968 | Zablocki | 264/309 |
| 3,440,086 | 4/1969 | Kerns | 264/309 |
| 3,839,533 | 10/1974 | Laing | 264/309 |
| 4,311,168 | 1/1982 | Peters et al. | 137/549 |
| 4,416,238 | 11/1983 | Knapp et al. | 239/533.2 |
| 4,646,975 | 3/1987 | Horn | 239/584 |
| 4,771,948 | 9/1988 | Furukawa et al. | 239/900 |
| 5,088,518 | 2/1992 | Stamatakis et al. | 137/549 |
| 5,088,650 | 2/1992 | Takagi et al. | 239/584 |

FOREIGN PATENT DOCUMENTS

| | | | |
|---|---|---|---|
| 3841010 | 6/1990 | Fed. Rep. of Germany . | |
| 2044429 | 2/1987 | Japan | 156/272.8 |
| 1-310934 | 12/1989 | Japan | 156/272.8 |
| 2225810 | 6/1990 | United Kingdom . | |

*Primary Examiner*—Willard Hoag
*Attorney, Agent, or Firm*—Edwin E. Greigg; Ronald E. Greigg

[57] ABSTRACT

A method for mounting a filter on the valve, the filter includes a filter cloth which is disposed on the circumference of the valve body in such a way that the filter cloth covers the through openings of the valve body. The filter cloth is provided with a sprayed plastic coating except in the area of the through openings in order to fix the filter cloth in its position relative to the through openings. In this way, contamination of the valve interior with plastic particles is avoided. The method according to the invention is particularly suitable for fuel injection valves for fuel injection systems of internal combustion engines.

6 Claims, 3 Drawing Sheets

METHOD FOR MOUNTING A FILTER ON THE VALVE

BACKGROUND OF THE INVENTION

The invention is based on a valve and a method for mounting a filter on the circumference of the valve body which defines a valve radially outwardly, and a valve, as defined hereinafter. In a valve known for instance from German Offenlegungsschrift 38 41 010 A1, a filter element is slipped onto the valve housing so that the at least one continuous opening embodied on the circumference of the valve housing is covered by the filter cloth in the region of the flow openings of the filter element. The filter element is produced by coating a filter cloth with plastic in an injection tool. When the filter element is mounted on the valve body, there is the danger that burrs on the filter element, which are created when it is removed from the molding tool, can become detached and contaminate the interior of the valve. Moreover, solely from the joining process, there is the possibility of removal of material from the inside of the filter element, since to fix its position it is necessary to press the filter on the valve housing.

Graduations of the diameter with round edges are also necessary on the valve body, to enable the filter element to be slipped onto the valve body, for instance onto the valve housing of the valve. Forming these graduations increases the production cost for a valve made in this way.

OBJECT AND SUMMARY OF THE INVENTION

The method according to the invention for mounting a filter on the circumference of a valve body, defining a valve radially outward has an advantage over the prior art that contamination of the valve interior is avoided, since the filter is not slipped onto the valve body and so no particles of material can be scraped off. The tightness between the sprayed plastic coating serving as a cloth holder and the valve body is attained by shrinking the sprayed plastic coating onto the valve body immediately after the coating process, as a result of the cooling of the plastic material. A further advantage is simpler and more economical production of the valve, because no diameter graduations with rounded edges are required on the circumference of the valve body in order to mount the filter.

It is particularly advantageous if the valve body has at least one recess on its circumference that is filled with the sprayed plastic coating. This assures a secure, reliable hold of the filter on the circumference of the valve body. It is also advantageous if the valve body has at least one flattened surface portion on its circumference, which is surrounded closely by the sprayed plastic coating of the filter. This effectively prevents twisting of the filter on the circumference of the valve body.

The invention will be better understood and further objects and advantages thereof will become more apparent from the ensuing detailed description of preferred embodiments taken in conjunction with the drawings.

DESCRIPTION OF THE PREFERRED EMBODIMENTS

Figure 1:
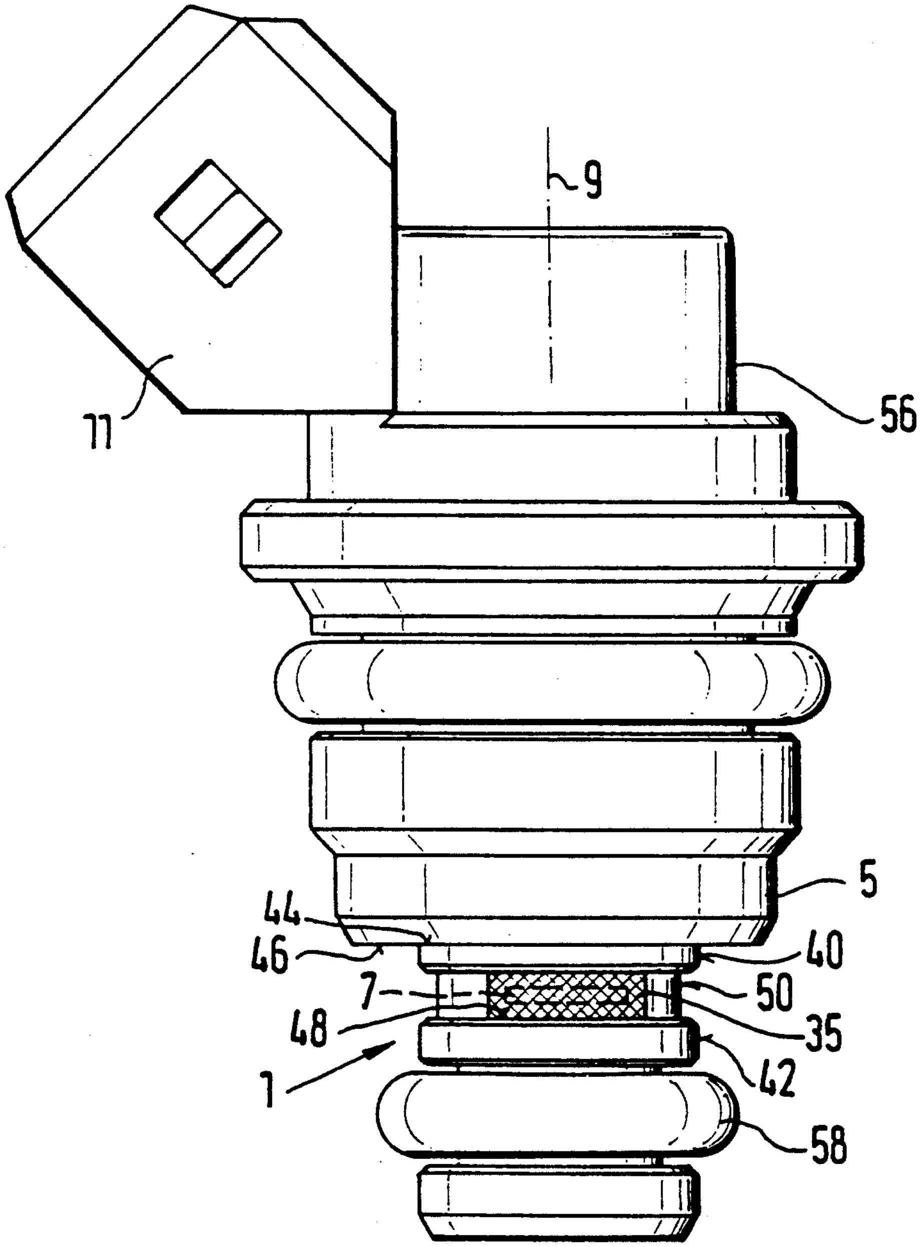
FIG. 1 shows a first exemplary embodiment of a valve with a filter mounted thereon in accordance with the invention.

The valves shown in FIGS. 1 to 4, in the form of electromagnetically actuatable fuel injection valves for fuel injection systems, for instance of mixture-compressing internal combustion engines with externally supplied ignition, have a filter 1 mounted in accordance with the invention, which serves to filter a fluid delivered to the valve. Elements that are the same and function the same are identified by the same reference numerals in all four drawing figures.

Figure 2:
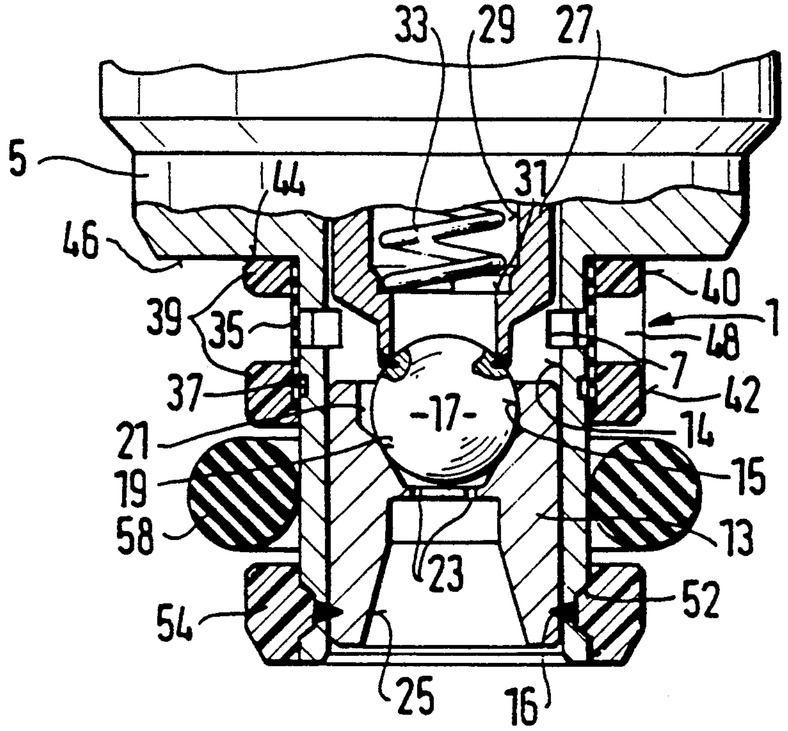
FIG. 2 is a fragmentary section of the first exemplary embodiment shown in FIG. 1.

In the first exemplary embodiment shown in FIGS. 1 and 2, the filter I is disposed on the circumference of a tubular nozzle body 5 that defines the valve radially outward. The nozzle body 5 has at least one and for instance two through openings 7 on its circumference, in the form of slits partly encompassing it, all of which are located at approximately the same axial height along the nozzle body 5.

These through openings 7 serve to deliver a fuel, for instance, into the interior of the tubular nozzle body 5. To actuate the valve, the valve has an electrical connection plug 11 on one end, which serves to provide electrical contact with a magnetic coil, not shown. On its end remote from the connection plug 11, a valve seat body 13 is slipped into a longitudinal opening 14 of the nozzle body 5 that extends concentrically with a longitudinal axis 9 of the valve. The valve seat body 13 is joined on its circumference to the wall of the longitudinal opening 14, on the end thereof remote from the electrical connection plug 11, for instance by means of a laser-welded seam 16.

In the upstream direction, toward the through openings 7 of the nozzle body 5, the valve seat body 13 has a guide bore 15 extending concentrically with the longitudinal valve axis 9, and a ball 17 that serves as a valve closing body is slidable supported in the guide bore 15. A fixed valve seat 19 that cooperates with the ball 17 is embodied in the valve seat body 13 downstream of the guide bore 15. The wall of the guide bore 15 is interrupted by fuel conduits 21 extending axially, which enable a flow of fuel to the valve seat 19. Downstream of the valve seat 19 in the valve seat body 13, injection ports 23, for instance two in number, are formed, which inject the fuel into a preparation bore 25 of the valve seat body 13; the preparation bore extends concentrically with the longitudinal valve axis 9 and widens in the downstream direction.

The ball 17 serving as the valve closing body is joined, remote from the valve seat 19, directly to a tubular armature 27, for instance by laser welding. The armature 27 cooperates with the magnetic coil and a core, not shown, of the valve and serves to actuate the valve. A retaining shoulder 31 is formed in a through bore 29 of the armature 27, and on this shoulder a restoring spring 33 is supported, oriented toward the valve seat 19 of the valve seat body 13. The restoring spring 33 is arranged to move the ball 17, serving as the valve closing body, in the direction of its valve seat 19, and thus to close the valve.

To mount the filter 1 on the circumference of the nozzle body 5, in a first method step according to the invention, a filter cloth 35 is disposed in such a way on the circumference of the nozzle body 5 that the through openings 7, for instance two in number, of the nozzle body 5 are covered by the filter cloth 35. To enable simple mounting of the filter cloth 35 on the circumference of the nozzle body 5 and to assure that the filter cloth 35 will be held on the nozzle body 5 until the filter 1 is finished, it is practical to use an annular filter cloth 35. A filter cloth 35 of this kind can be produced, in a known manner, for instance by welding together the two ends of a strip-like filter cloth.

Figure 3:
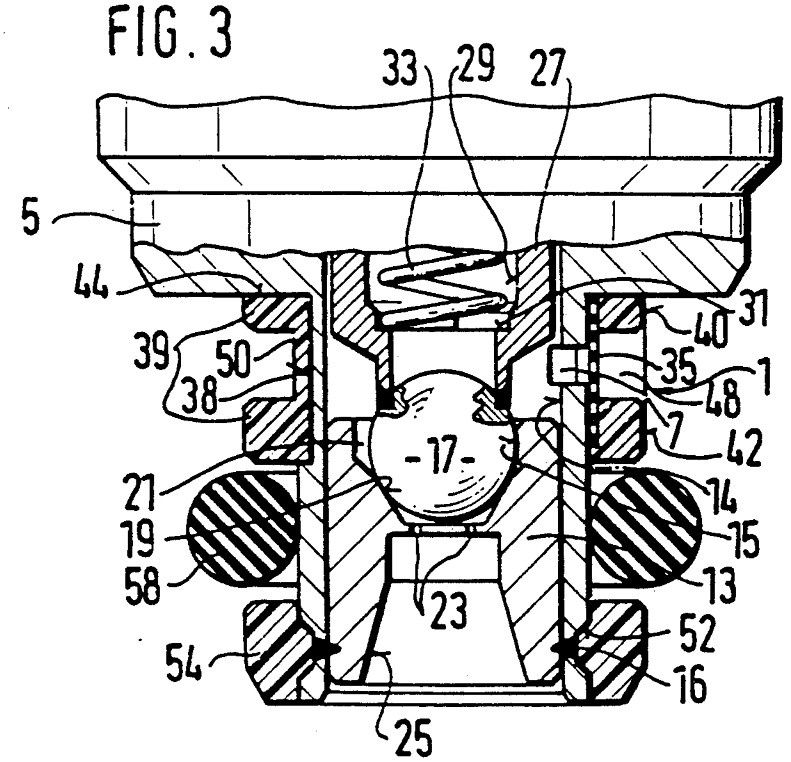
FIGS. 3 and 4, respectively, show a second and third exemplary embodiment of a valve with a filter mounted thereon according to the invention.

It is also possible, as in FIG. 3, which shows a second exemplary embodiment of a valve according to the invention, to cover the through openings 7 of the nozzle body 5 with individual pieces of filter cloth, which are somewhat larger than the cross section of the applicable through opening .7 which may have a round, rectangular, oval or other shape. The pieces of filter cloth accordingly then extend only part-way over the circumference of the nozzle body 5.

At least one recess 37 is embodied on the circumference of the nozzle body 5, for instance in the region covered by the filter cloth 35; in the first exemplary embodiment shown, the recess has the form of an encompassing groove. In a second method step, the nozzle body 5, in the region of the filter cloth 35, is provided with a sprayed plastic coating 39 partly covering the filter cloth 35; above and below the opening 7; after the coating operation, this coating cools down and shrinks, so that the filter cloth 35 is fixed in its position relative to the through openings 7 of the nozzle body 5, and the sprayed plastic coating 39 sealingly encloses the nozzle body 5. The recess 37 formed on the circumference of the nozzle body 5 is filled with the sprayed plastic coating 39, so that a particularly firm, secure hold of the filter 1, comprising the filter cloth 35 and the sprayed plastic coating 39 is attained, in the axial direction on the circumference of the nozzle body 5. To prevent twisting of the filter 1 on the circumference of the nozzle body 5, it is also possible, as shown in FIG. 3, for there to be at least one flattened surface 38, which is tightly surrounded by the sprayed plastic coating 39, embodied on the circumference of the nozzle body 5 in the region of the sprayed plastic coating 39.

The sprayed plastic coating 39 of the filter 1 has an upper collar 40 on its end remote from the valve seat 19 and a lower collar 42 on its end toward the valve seat 19. With one, upper end face 44, formed by the upper collar 40 of the plastic coating 39, the filter 1 rests on a holding face 46 of the nozzle body 5 that is oriented toward the filter 1 and points radially outward.

Between the upper collar 40 and the lower collar 42 of the plastic coating 39, flow openings 48 are formed in the plastic coating 39 that cover the filter cloth 3 in the region of the through openings 7 of the nozzle body 6 and thus serve to supply fuel to the valve. The flow openings 48 are defined by axially extending ribs 50, which join the upper collar 40 and lower collar 42 of the plastic coating 39 of the filter 1 together in areas other than over the through openings 7, and which also support the filter cloth 35 of the filter and hold it securely and reliably on the circumference of the nozzle body 5 in the region of the through openings 48. That is, along the upper and lower portions of the nozzle body 5 along the through openings 7 and at the ends of the through openings 7.

In the region of the laser-welded seam 16, extending in an encompassing cross-sectional reduction 52 of the nozzle body 5, the nozzle body 5 is surrounded by a retaining collar 54. The encompassing retaining collar 54 is made jointly with the embodiment of a plastic sheath 56 that partly surrounds the valve in the axial direction. The plastic material of the retaining collar 54 fills the encompassing cross-sectional reduction 52 of the nozzle body 5 and thus protects the laser-welded seam 16 from external damage in a simple manner.

A sealing ring 58 is disposed o the circumference of the nozzle body 5, axially between the lower collar 42 of the filter 1 and the retaining collar 54. The sealing ring 58 serves the purpose of sealing between the circumference of the valve and a valve holder, not shown, such as an intake line of the engine.

Figure 4:
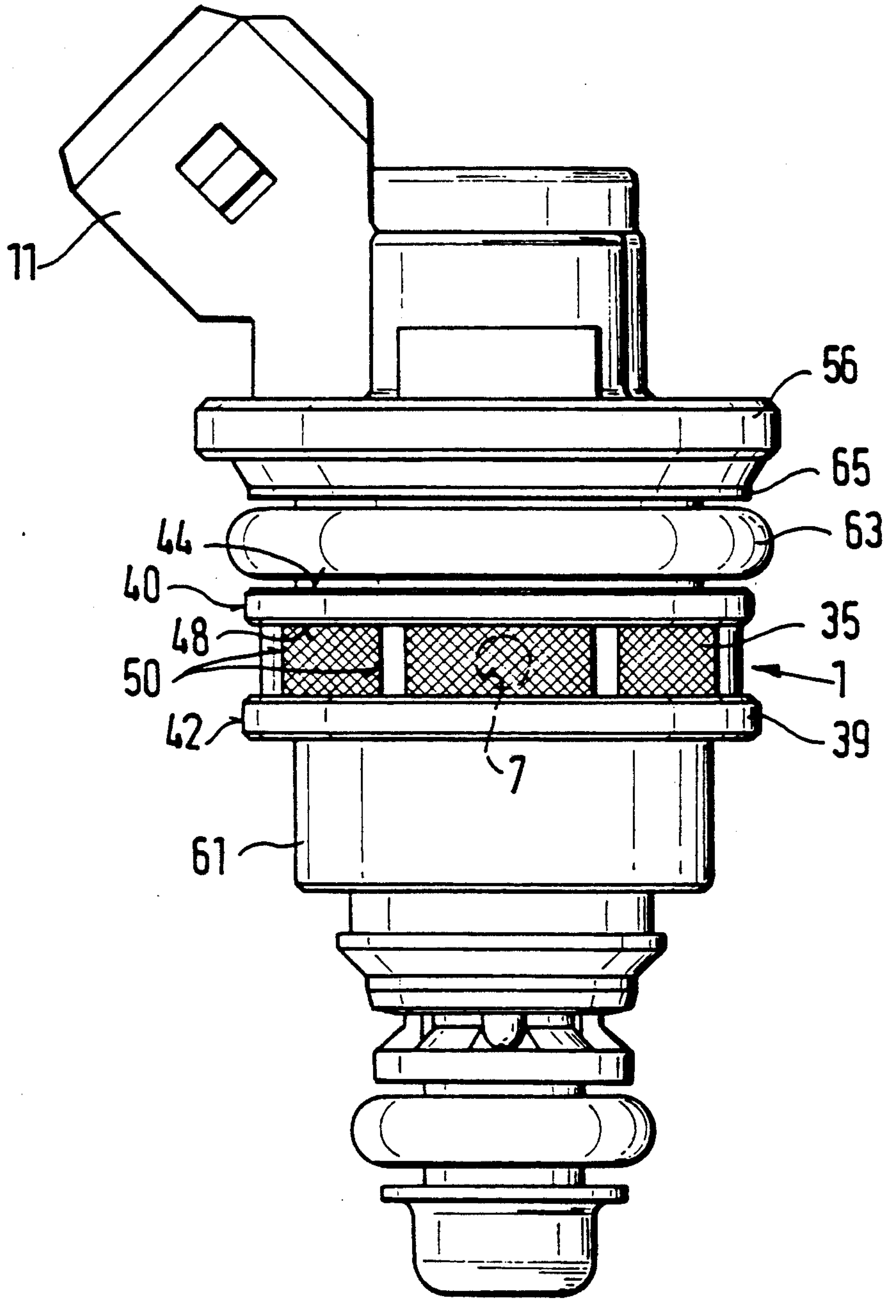

FIG. 4 shows a third exemplary embodiment of a valve, embodied for instance as a fuel injection valve, having a filter 1 mounted according to the invention. In this exemplary embodiment, the filter 1 is disposed on the circumference of a valve housing 61 radially defining the valve toward the outside. The valve housing has six through openings 7, for instance on its circumference, which are in the form of bores and all of which are located at least approximately at the same axial height and serve to deliver a fuel, for instance, through the wall of the valve housing 61 into the interior of the valve or serve to allow excess fuel to drain out of the valve. Such a filter may be used on a valve housing which has both an inflow and outflow of fuel at different portions of the valve housing.

To mount the filter 1 on the circumference of the valve housing 61, the filter cloth 35, which for instance is in the form of a ring, is disposed on the circumference of the valve housing 61, in a first method step according to the invention, in such a way that the six through openings 7 are covered by the filter cloth 35. In a second method step, the valve housing 61 is provided in the region of the filter cloth 35 with a sprayed plastic coating 39, which partly covers the filter cloth 35 and which, after the coating operation, cools down and shrinks, so that the filter cloth 35 is retained in its position relative to the through openings 7 of the valve housing 61, and the plastic coating 39 sealingly encloses the valve housing 61.

The upper collar 40 and lower collar 42 of the plastic coating 39 of the filter 1 serve essentially to retain the filter 1 on the circumference of the valve housing 61. Between the upper collar 40 and the lower collar 42 in the plastic coating 39, flow openings 48 ar provided to supply fuel to the valve; they extend across the filter cloth 35 in the region of the through openings 7 of the valve body 5. The ribs 50, formed in the axial direction between the upper collar 40 and lower collar 42 define the flow openings 48 in the circumferential direction of the filter 1, support the filter cloth 35 of the filter 1, and retain it on the circumference of the valve housing 61.

A sealing ring 63 is disposed on the circumference of the valve housing 61. The axial mobility of the sealing ring 63 is limited by the upper face end 44 of the upper collar 40 of the filter 1 and by a retaining flange 65 of the plastic sheath 56 of the valve, the flange being oriented toward the electric connection plug 11 of the valve. The method according to the invention offers the advantage that as a result of the direct application of the sprayed plastic coating 39 on the circumference of the valve body 5, 61 in the region of the filter cloth 35, a filter 1 is formed in a simple manner in such a way that contamination of the valve interior is avoided.

The foregoing relates to preferred exemplary embodiments of the invention, it being understood that other variants and embodiments thereof are possible within the spirit and scope of the invention, the latter being defined by the appended claims.

What is claimed and desired to be secured by Letters Patent of the United States is:

1. A method for mounting a filter on the circumference of a valve body of a valve, especially of a fuel injection valve, said valve body defining in a radial direction the outside of the valve, the valve body having at least one through opening on its circumference, through which fuel flows, the method steps comprise applying a filter cloth in such a way on the circumference of the valve body that the at least one through opening is covered by the filter cloth, spraying a plastic coating onto different portions of the filter cloth, leaving at least one opening through which fuel can flow through the filter cloth and the at least one through opening into the valve body and permitting the plastic coating to cool thereby shrinking on the filter cloth, and on at least one portion of the circumference of the valve body so as in this way to fix the filter cloth in its position relative to the valve body.

2. A method as defined by claim 1, wherein the valve body has at least one recess on its circumference, and filling the recess with the sprayed plastic coating during spraying of the plastic coating.

3. A method as defined by claim 1, in which the valve body has on its circumference at least one flattened surface portion which is closely surrounded by the sprayed plastic coating of the filter.

4. A method as defined by claim 2, in which the valve body has on its circumference at least one flattened surface portion which is closely surrounded by the sprayed plastic coating of the filter (1).

5. A method as defined by claim 1, in which the valve body is a nozzle body of the valve.

6. A method as defined by claim 1, in which the valve body is a valve housing of the valve.

* * * * *